(12) United States Patent
Basile

(10) Patent No.: US 9,087,030 B2
(45) Date of Patent: Jul. 21, 2015

(54) HANDLING EXCESSIVE INPUT CHARACTERS IN A FIELD

(75) Inventor: Ryan M. Basile, Shoreline, WA (US)

(73) Assignee: International Business Machines Corporation, Armonk, NY (US)

(*) Notice: Subject to any disclaimer, the term of this patent is extended or adjusted under 35 U.S.C. 154(b) by 348 days.

(21) Appl. No.: 13/550,258

(22) Filed: Jul. 16, 2012

(65) Prior Publication Data
US 2014/0019841 A1    Jan. 16, 2014

(51) Int. Cl.
G06F 17/00    (2006.01)
G06F 17/24    (2006.01)
G06F 17/21    (2006.01)

(52) U.S. Cl.
CPC .............. *G06F 17/24* (2013.01); *G06F 17/211* (2013.01)

(58) Field of Classification Search
CPC ..... G06F 17/211; G06F 17/24; G06F 17/243; G06F 17/214; G06F 17/2294; G06F 3/0485; G06F 3/0482
USPC .................. 715/224, 225, 226, 256, 788, 800
See application file for complete search history.

(56) References Cited

U.S. PATENT DOCUMENTS

| | | | | |
|---|---|---|---|---|
| 6,735,347 | B1* | 5/2004 | Bates et al. | 382/282 |
| 8,627,222 | B2* | 1/2014 | Hartwell et al. | 715/764 |
| 2002/0015167 | A1 | 2/2002 | Watanabe et al. | |
| 2002/0122197 | A1* | 9/2002 | Abir | 358/1.11 |
| 2004/0162877 | A1* | 8/2004 | Van Dok et al. | 709/204 |
| 2004/0255249 | A1* | 12/2004 | Chang et al. | 715/723 |
| 2006/0112333 | A1* | 5/2006 | Iwanaga | 715/531 |
| 2007/0061719 | A1* | 3/2007 | Law | 715/700 |
| 2007/0061754 | A1* | 3/2007 | Ardhanari et al. | 715/816 |
| 2007/0088705 | A1 | 4/2007 | Chen et al. | |
| 2008/0109752 | A1* | 5/2008 | Bayley et al. | 715/800 |
| 2008/0270897 | A1* | 10/2008 | Jawerth et al. | 715/261 |
| 2010/0030749 | A1* | 2/2010 | Dahn | 707/3 |
| 2010/0064252 | A1* | 3/2010 | Kramer et al. | 715/810 |
| 2010/0153880 | A1* | 6/2010 | Dinn | 715/816 |
| 2010/0174728 | A1* | 7/2010 | Ding | 707/758 |
| 2010/0198768 | A1* | 8/2010 | Zhou et al. | 706/47 |
| 2010/0257478 | A1* | 10/2010 | Longe et al. | 715/773 |
| 2011/0246941 | A1* | 10/2011 | Gonzalez | 715/816 |
| 2012/0281011 | A1* | 11/2012 | Reichenstein | 345/596 |
| 2013/0321340 | A1* | 12/2013 | Seo et al. | 345/174 |

OTHER PUBLICATIONS

Korpela, Jukka, "How to limit the number of characters entered in a textarea in an HTML form and other notes on textarea elements", Mar. 15, 2006, 12 pages.

* cited by examiner

*Primary Examiner* — Laurie Ries
(74) *Attorney, Agent, or Firm* — DeLizio Law, PLLC

(57) ABSTRACT

Some embodiments of the inventive subject matter include a computer-implemented method for processing text received in a first input filed. The method can include detecting the first input field configured to receive text, wherein the input field has a character limit defining a maximum number of characters that can be entered into the first input field. The method can also include receiving a first set of characters in the first input field, wherein a count of the first set of characters does not exceed the character limit. The method can also include receiving a second set of characters in the first input field. The method can also include detecting that a count of the second set of characters and the first set of characters exceeds the character limit, and presenting a second input field, wherein the second input field includes at least the second set of characters.

20 Claims, 5 Drawing Sheets

HANDLING EXCESSIVE INPUT CHARACTERS IN A FIELD

BACKGROUND

Embodiments of the inventive subject matter generally relate to the field of data processing, and more particularly to processing text in input fields in computer programs.

When an input field has a limit, a user is prevented from entering excessive text. That is, an input field having limited size prevents a user from entering text that goes beyond the input field's size. Some input fields prevent the user from entering extra text, automatically delete extra text as the user is typing, or display a current character count. Character limits and automatic text deletion allows entered text to be lost, which increases likelihood for poor data entry.

SUMMARY

Some embodiments of the inventive subject matter include a computer-implemented method for processing text received in an input filed. The method can include presenting, under control of a processor, the input field configured to receive text, wherein the input field has a character limit defining a maximum number of characters that will appear in the input field. The method can also include receiving a first group of text in the input field, wherein the first group of text does not exceed the character limit. The method can also include receiving a second group of text in the input field. The method can also include detecting that the second group of text combined with the first group of text exceeds the character limit, and presenting, in response to the detecting, an input viewer including the first and second groups of text.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Some embodiments of the inventive subject matter enable users to enter large text strings into input fields without losing text. As noted above, some input fields are limited to a maximum number of characters, such as 40 characters. For such input fields, if users enter more than 40 characters, the input fields may cease accepting text beyond the 40 character limit. However, some embodiments of the inventive subject matter enable users to enter large quantities of text without losing a portion of the text. To facilitate this, after a user enters text exceeding an input field limit, some embodiments present a text viewer showing all text entered into the input field. In some instances, the text that does not exceed the input field limit appears differently than text exceeding the limit. For example, if the limit is 40 characters, the first 40 characters appear as text in a given font and size, whereas text beyond the fortieth character appears with highlighting or other distinguishing characteristics (e.g., different font, different size, italics, underlining, text-to-speech pitch, text-to-speech speed, etc.). Additionally, some embodiments enable users to copy and save text in the text editing window. These and other embodiments will be described in greater detail below.

Figure 1:
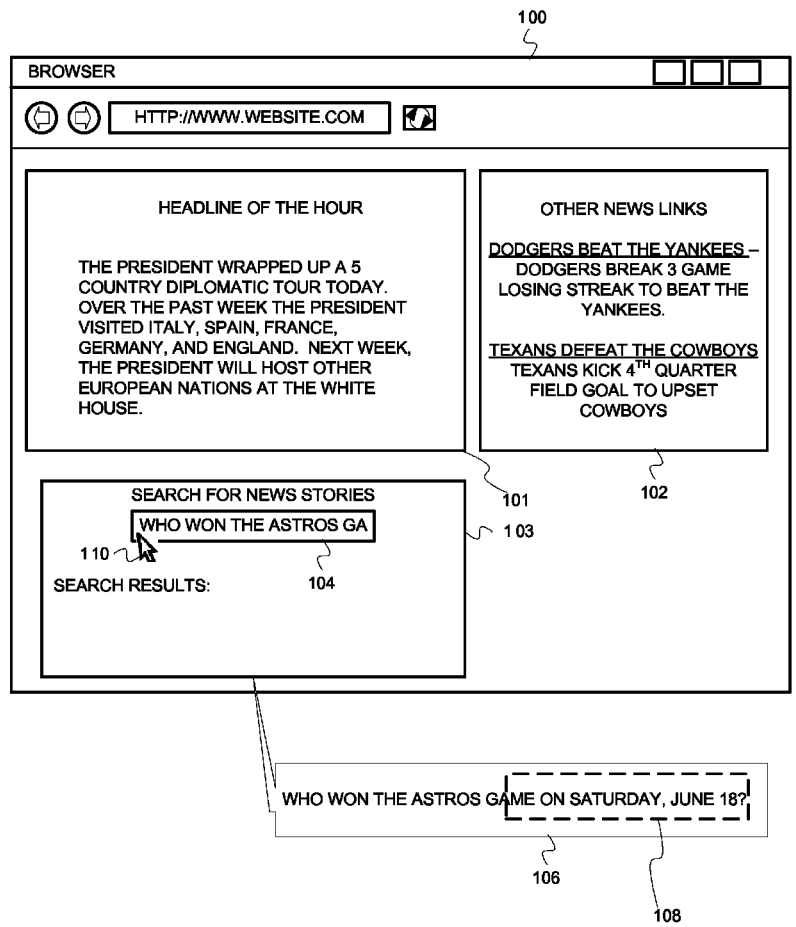
FIG. 1 depicts a web browser program 100 including an input field 104.
Figure 2:
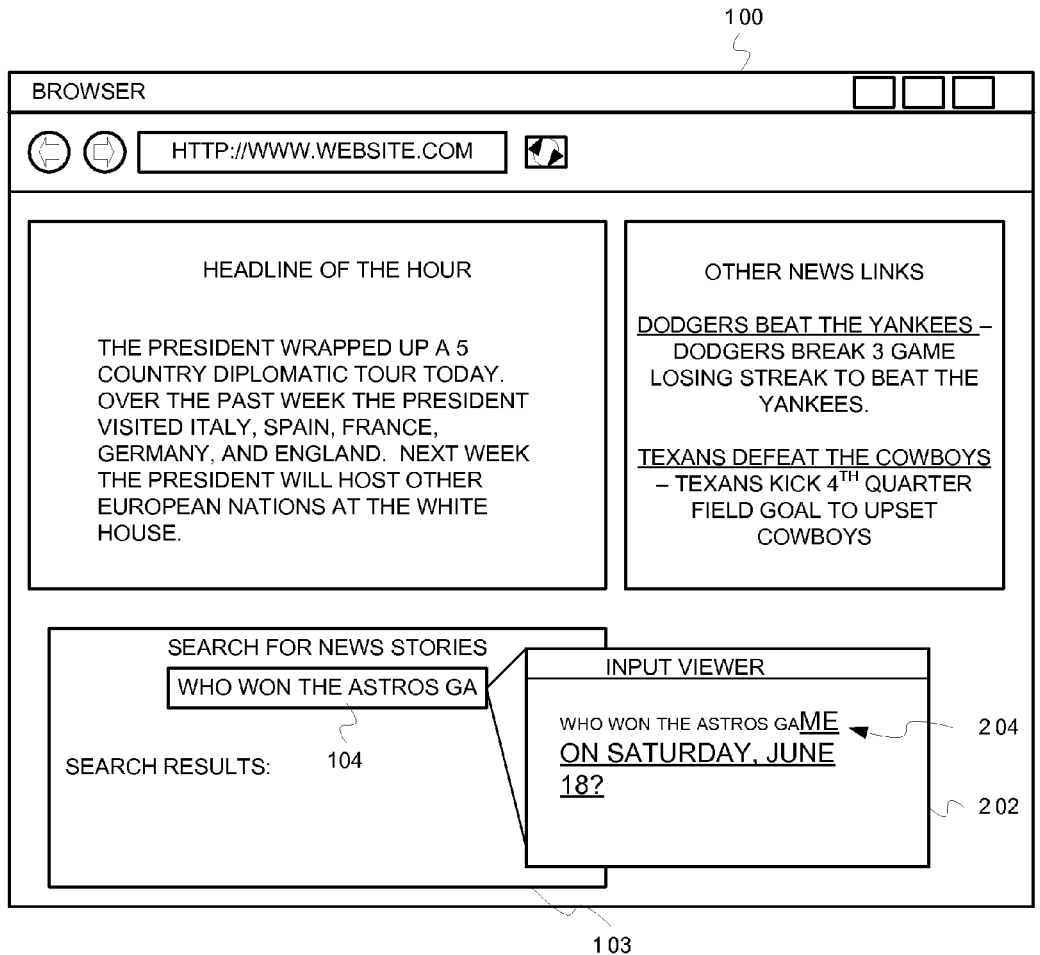
FIG. 2 depicts the web browser program 100 including the input field 104 and an input viewer 202.

FIG. 1 depicts a web browser program 100 including an input field 104. In FIG. 1, a web browser program 100 includes panes 101, 102, and 103. The pane 101 presents a news article, and the pane 102 presents news links. The pane 103 includes an input field 104 for receiving text input from a user. As shown, the input field 104 is for receiving text constituting a search query for searching news stories. To activate the input field 104, a user can mouse-click on the field 104 with a cursor 110. Upon activating the input field 104, a user can enter text. As shown, a user has entered the following text: "WHO WON THE ASTROS GA". The user, however, intended to enter the text "WHO WON THE ASTROS GAME ON SATURDAY, JUNE 18?", as depicted in box 106. As shown, the input field 104 has a maximum character limit (e.g., 17 characters). Therefore, any text beyond the limit (e.g., text beyond the 17th character, indicated by box 108) does not appear in the input field 104. However, embodiments of the inventive subject matter do not lose the excess text (e.g., text exceeding 17 characters). Although the input field 104 has a text limit of 17 characters, embodiments can accommodate input fields with any suitable text limit. For example, some embodiments may display the text that exceeds the maximum character limit. Although FIG. 1 describes the input field 104 receiving text for a search query, embodiments can work for any suitable program logic that requires text input. FIG. 2 shows how some embodiments deal with the excess text.

FIG. 2 depicts the web browser program 100 including the input field 104 and an input viewer 202. In FIG. 2, after a user enters text exceeding a limit of the input field 104 (e.g., 17 characters), the browser program 100 presents an input viewer 202 showing all text entered in the input field 104 (including text exceeding the 18 character limit). As shown, the following is all text entered into the input field 104: "WHO PORTRAYED THE FOURTH DOCTOR WHO?" Some embodiments distinguish the excess text 204 from text fitting in the input field 104. In the input viewer 202, text fitting in the input field 104 appears in 10 point Arial font, whereas the excess text appears in 12 point Arial font with underlining. Some embodiments may distinguish the excess text in other ways, such as using highlighting, italics, different color fonts, etc. In some embodiments, the input viewer 202 has text-to-speech capabilities. Therefore, the input viewer 202 may provide audible cues distinguishing the excess text, such as by reading the excess text in a different tone of voice, presenting an audible marker when commencing to read the excess text, etc. In some embodiments, the input field may show all text beyond the character limit with the same distinguishing characteristics as the input viewer.

Figure 3:
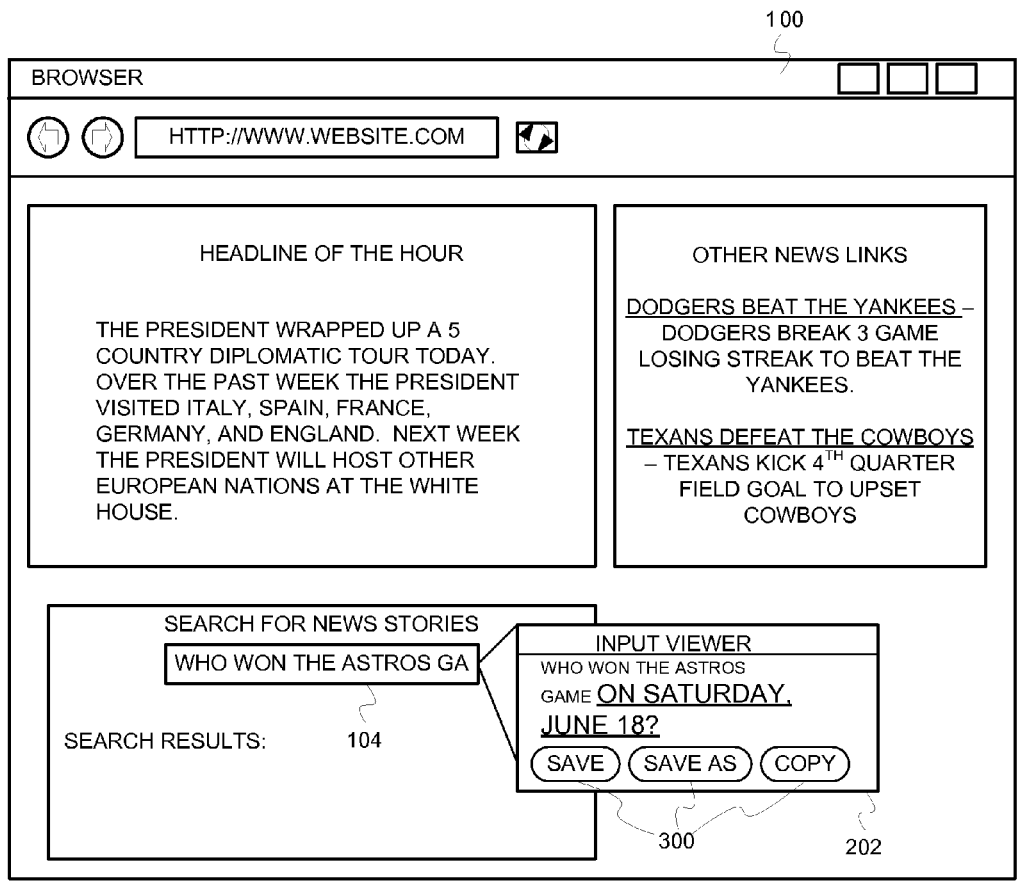
FIG. 3 depicts the web browser program 100 including the input viewer 202 with controls for copying and saving text.

Some embodiments enable users to save or copy text from the input viewer. FIG. 3 depicts the web browser program 100 including the input viewer 202 with controls for copying and saving text. As shown, the input viewer 202 includes controls (e.g., graphical user interface buttons 300) for saving some or all the text appearing in the viewer. The input viewer 202 can save text to a default file, a file specified by the user, etc. For example, after detecting a mouse-click on the save control 300, the input viewer 202 may prompt the user for a file name, and then save all text to the file. In some instances, the input viewer 202 may save only a portion of the text (e.g., text selected using the mouse cursor, just the excess text, etc.) Additionally, the input viewer 202 can copy text to a system clip board, or other destinations identified by the user. For example, after detecting a mouse-click on the copy control, the input viewer may copy all text directly to a system clipboard. Alternatively, the input viewer may solicit user input indicating a destination (e.g., another application program) for the copy operation. The input viewer may copy all or a portion (e.g., a portion selected via the mouse cursor) of the text to the destination. As a result, embodiments enable users to avoid losing excess text in input fields.

Although above-described examples refer to a web browser program, embodiments of the inventive subject matter are not limited to browser programs. That is, the operations for preserving text can be used with any suitable input field, regardless of the program type. In some instances, text preservation is limited by machine resources. For example, an application program that employs the text preservation techniques described herein may have limited memory resources, so the program may impose some limit on the amount of text captured by the input viewer. However, such limits will be larger than limits for input fields.

Figure 4:
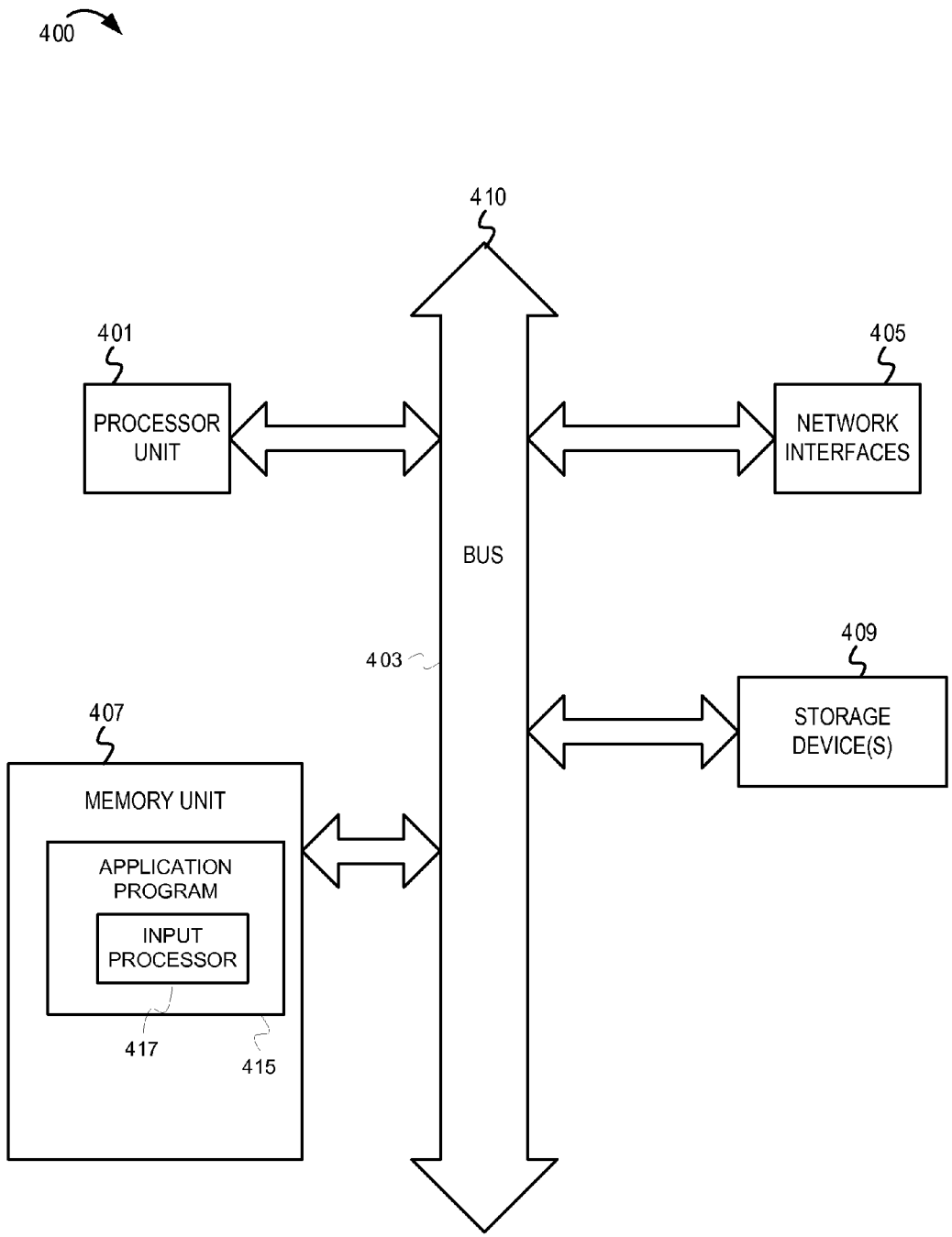
FIG. 4 depicts an example computer system including an application program configured to avoid losing excess text in input fields, according to some embodiments.

This discussion will continue with a description of some structural aspects of some embodiments. FIG. 4 depicts an example computer system including program logic configured to avoid losing excess text in input fields, according to some embodiments. A computer system 400 includes a processor unit 401 (possibly including multiple processors, multiple cores, multiple nodes, and/or implementing multi-threading, etc.). The computer system also includes a bus 403 (e.g., PCI, ISA, PCI-Express, HyperTransport®, Infini-Band®, NuBus, etc.), network interface 405 (e.g., an ATM interface, an Ethernet interface, a Frame Relay interface, SONET interface, wireless interface, etc.), and storage device (s) 409 (e.g., optical storage, magnetic storage, etc.

The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The system memory 407 embodies functionality to implement embodiments described above. In FIG. 4, the memory unit 407 includes an application program 415 that includes an input processor 417 configured to perform the operations described herein. For example, the application program 415 may be configured to receive user input in one or more input fields. The input viewer 417 can present text that has been entered in an input field, and perform other operations described herein.

In some embodiments, functionality for avoiding text loss may be partially (or entirely) implemented in hardware and/or on the processing unit 401. For example, the functionality may be implemented with an application specific integrated circuit, in logic implemented in the processing unit 401, in a co-processor on a peripheral device or card, etc. Furthermore, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

Figure 5:
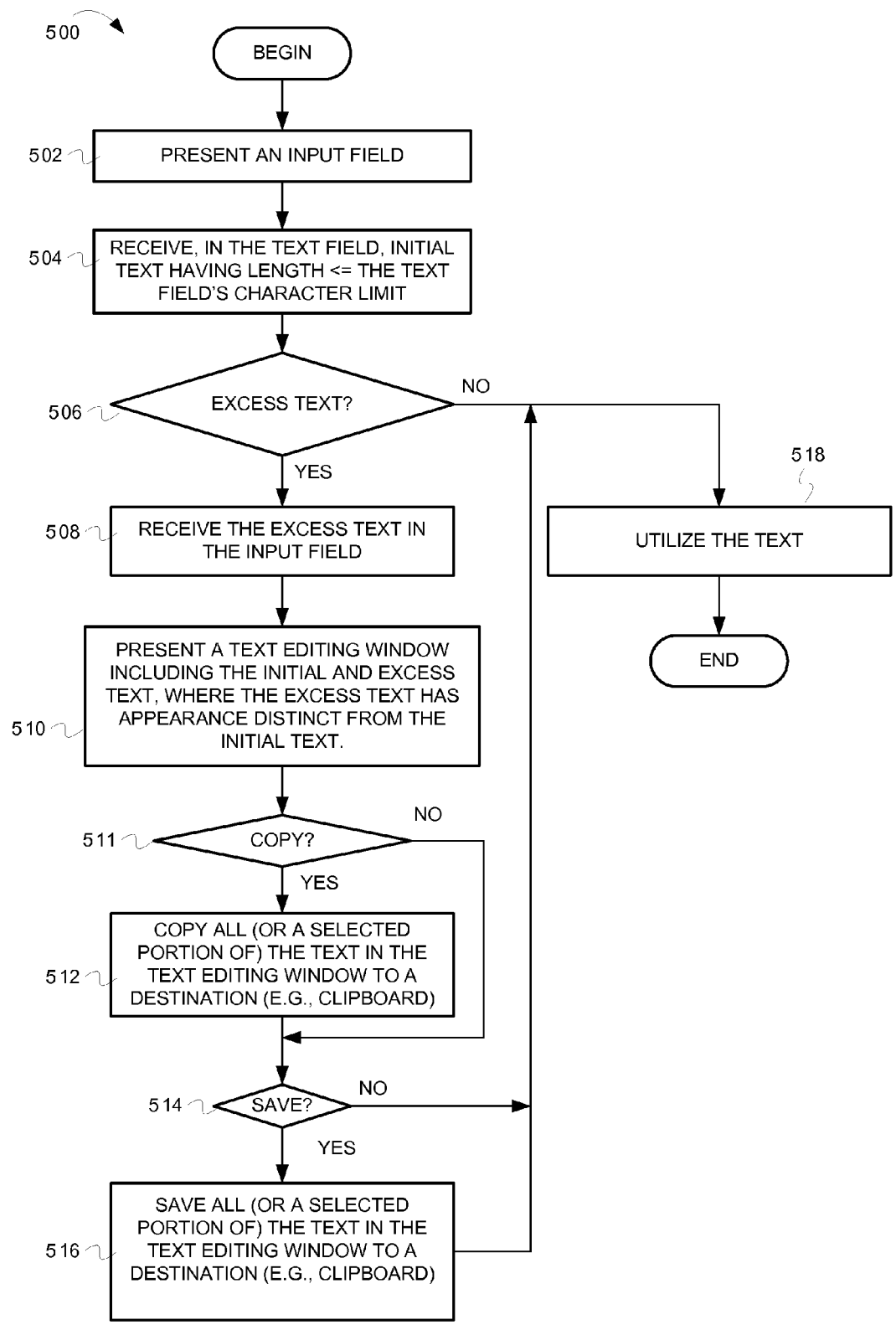
FIG. 5 is a flow diagram illustrating operations for preserving text entered into an input field, according to some embodiments of the inventive subject matter.

This discussion will now proceed with a discussion of operations performed by some embodiments. FIG. 5 is a flow diagram illustrating operations for preserving text entered into an input field, according to some embodiments of the inventive subject matter. In FIG. 5, a flow 500 begins at block 502, where an application program presents an input field for receiving text input from a user. As an example, FIG. 1 shows a web browser program 100 presenting an input field 104. The flow continues at block 504.

At block 504, the input field receives initial text less than or equal to a character limit for the input field. For example, see the input field 104 in FIG. 1. The flow continues at block 506.

At block 506, the input processor determines whether there is additional text exceeding its character limit. If there is no excess text, the flow continues at block 518. However, if there is excess text, the flow continues at block 508.

At block 508, the input field receives excess text. The flow continues at block 510, where the input processor presents a text viewer including the initial and excess text. For example, referring to FIG. 2, the input processor can present the input viewer 202, which shows the initial and excess text. In some embodiments, the excess text is distinguished from the initial text. In FIG. 2, the excess text is formatted with a larger font size and underlining. Embodiments can any distinguish the excess text using suitable distinguishing characteristics, such as highlighting, bold, italics, colored fonts, etc. For instances in which the input viewer 202 has text-two-speech capabilities, the input viewer 202 can audibly distinguish the excess text using any suitable cue, such as different tone, different voice, etc. The flow continues at block 511.

At block 511, the input processor determines whether a user has activated a control that initiates a process for copying text from the input viewer. If the user has not initiated the copy process, the flow continues at block 518. If the user has initiated the copy process, the flow continues at block 512.

At block 512, the input processor copies all (or a selected portion of) the text in the input viewer to a destination, such as a system clipboard, application program, etc. In some embodiments, a user can configure the input viewer to copy text to a particular destination. The flow continues at block 514.

At block 514, the input processor determines whether a user has activated a control that initiates a process for saving text from the input viewer. If the save process has been initiated, the flow continues at block 516. Otherwise, the flow continues at block 518.

At block 516, the input processor saves all (or a selected portion of) the text in the input viewer to a destination, such as a user-identified file, or other suitable location. In some embodiments, a user can configure the input viewer to save text to a particular destination. The flow continues at block 518.

At block 518, the application program utilizes text entered in the input field. In some embodiments, the application program only utilizes text up to a character limit of the input field. For example, a browser application program may create a search query based on text up to the input field's character limit. From block 518, the flow ends.

This description includes exemplary systems, methods, techniques, instruction sequences, and computer program products that embody techniques of the present inventive subject matter. However, some embodiments may be practiced without these specific details. In some instances, well-known instruction instances, protocols, structures, and techniques have been omitted to avoid clouding the description of the inventive subject matter.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   detecting a first input field, wherein the first input field is configured to receive text, wherein the first input field has a character limit defining a maximum number of characters that can be entered into the first input field;
   receiving a first set of characters in the first input field, wherein a count of the first set of characters does not exceed the character limit;
   receiving a second set of characters in the first input field;
   detecting that a count of the second set of characters and the first set of characters exceeds the character limit; and
   presenting, in response to said detecting that the count of the second set of characters and the first set of characters exceeds the character limit, a second input field, wherein the second input field includes at least the second set of characters.

2. The method of claim 1 further comprising:
receiving user input initiating a process for saving the first and second sets of characters to a file;
saving the first and second sets of characters to the file.

3. The method of claim 1 further comprising:
receiving user input initiating a process for copying the first and second sets of characters to a destination;
copying the first and second sets of characters to the destination.

4. The method of claim 3, wherein the destination is a system clipboard.

5. The method of claim 1, wherein the second set of characters is presented in a manner that distinguishes the second set of characters from the first set of characters.

6. The method of claim 1, wherein the second set of characters does not appear in the first input field.

7. The method of claim 1, wherein the second input field further includes the first set of characters.

8. A computer program product for processing text received in a first input field, the computer program product comprising:
a computer readable storage medium having computer usable program code embodied therewith, the computer usable program code comprising computer usable program code configured to:
detect the first input field, wherein the first input field is configured to receive text, wherein the first input field has a character limit defining a maximum number of characters that can be entered into the first input field;
detect entry of first text in the first input field, wherein a count of characters in the first text equals the character limit;
detect an attempt to enter second text in the first input field;
detect that a count of characters in the second text and the first text exceeds the character limit; and
present, in response to detection that the count of characters in the second text and the first text exceeds the character limit, a second input field, wherein the second input field includes at least the second text.

9. The computer program product of claim 8, wherein the computer usable program code further comprises code configured to:
receive user input initiating a process for saving the first and second text to a file;
save the first and second text to the file.

10. The computer program product of claim 8, wherein the computer usable program code further comprises code configured to:
receive user input initiating a process for copying the first and second text to a destination;
copy the first and second text to the destination.

11. The computer program product of claim 10, wherein the destination is a system clipboard.

12. The computer program product of claim 8, wherein the second text is presented in a manner that distinguishes the second text from the first text.

13. The computer program product of claim 8, wherein the second text does not appear in the first input field.

14. The computer program product of claim 8, wherein the second input field further includes the first text.

15. An apparatus comprising:
a processor;
a computer readable storage medium including computer usable program code executable by the processor, the computer useable program code configured to:
detect a first input field, wherein the first input field is configured to receive text, wherein the first input field has a character limit defining a maximum number of characters that can be entered into the first input field;
receive a first group of text in the first input field, wherein the first group of text does not exceed the character limit;
receive a second group of text in the first input field;
detect that the second group of text combined with the first group of text exceeds the character limit;
present, in response to detection that the second group of text combined with the first group of text exceeds the character limit, a second input field including at least the second group of text.

16. The apparatus of claim 15, wherein the computer usable program code further comprises code configured to:
receive user input initiating a process for saving the first and second groups of text to a file;
save the first and second groups of text to the file.

17. The apparatus of claim 15, wherein the computer usable program code further comprises code configured to:
receive user input initiating a process for copying the first and second groups of text to a destination;
copy the first and second groups of text to the destination.

18. The apparatus of claim 17, wherein the destination is a system clipboard.

19. The apparatus of claim 15, wherein the second group of text is presented in a manner that distinguishes the second group of text from the first group of text.

20. The computer program product of claim 8, wherein the character limit cannot be modified.

* * * * *